(12) United States Patent
Weynachter

(10) Patent No.: US 6,310,560 B2
(45) Date of Patent: *Oct. 30, 2001

(54) COMMUNICATION DEVICE AND PROCESS

(75) Inventor: Luc Weynachter, Grenoble (FR)

(73) Assignee: Scheider Electric SA (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,687

(22) Filed: Jul. 24, 1998

(30) Foreign Application Priority Data

Aug. 20, 1997 (FR) .................................................. 97 10631

(51) Int. Cl.[7] .............................. G08C 19/04; G08C 19/10
(52) U.S. Cl. ................................ 340/870.11; 340/870.07; 340/3.32; 340/3.71; 361/93.2
(58) Field of Search .......................... 340/870.02, 870.11, 340/825.06, 825.15, 825.16, 870.07; 361/93.2

(56) References Cited

U.S. PATENT DOCUMENTS

| | | | |
|---|---|---|---|
| 4,972,290 | * 11/1990 | Sun et al. | 361/64 |
| 5,025,470 | 6/1991 | Thornborough et al. | 379/107 |
| 5,031,209 | 7/1991 | Thornborough et al. | 379/107 |
| 5,426,421 | * 6/1995 | Gray | 340/825.15 |
| 5,553,094 | * 9/1996 | Johnson et al. | 375/200 |
| 5,617,286 | * 4/1997 | Jenkins | 361/93.2 |
| 5,739,760 | * 4/1998 | Hatakeyama | 340/825.15 |
| 5,748,104 | * 5/1998 | Argyroudis et al. | 340/870.11 |

* cited by examiner

Primary Examiner—Timothy Edward, Jr.
(74) Attorney, Agent, or Firm—Parkhurst & Wendel, L.L.P.

(57) ABSTRACT

The communication device comprises a central unit and at least one station connected by a network. The station comprises a checking circuit and a storage circuit connected to the checking circuit. The storage circuit stores data representative of information which the station has to transmit to the central unit and transmission condition parameters associated to said information. In a parameter setting phase, the station receives the data and parameters to be stored. Then, in an operating phase, the checking circuit transmits information according to the stored transmission condition parameters.

13 Claims, 4 Drawing Sheets

COMMUNICATION DEVICE AND PROCESS

BACKGROUND OF THE INVENTION

The invention relates to a communication device comprising a central unit and at least one station, and also to a communication process between said central unit and said station.

Known communication devices comprise a central unit and stations connected via a communication network. Information exchanges between the stations and the central unit generally take place according to a master-slave communication mode or continuously on events.

In the master-slave exchange mode, the central unit requests information from a station which replies to it by transmitting the requested information back to it. This exchange mode has the advantage of being simple. However, the information flow across the network becomes high and there is a risk of saturation due to the double information flow. Indeed, before each item of information which a station has to transmit to the central unit, there is a request from the central unit to said station.

Transmission of information on events does not require a request from the central unit at each information exchange. In this exchange mode, a station transmits information to the central unit of its own accord when an event is detected by said station. This exchange mode is also simple but the information flow is also liable to be high. If the quantity of data liable to be transmitted by the stations is high, the central unit is in fact liable to receive a large quantity of useless information which congests the communication network and consequently reduces its performances.

The exchange on event mode is well suited to communication devices in which the stations have a small quantity of information to transmit. But when the stations are associated in particular to complex apparatuses such as circuit breakers comprising electronic trip devices or measuring devices or devices for computing several electrical quantities, the master-slave or on-event exchange modes do not allow optimum use of the communication network.

SUMMARY OF THE INVENTION

The object of the invention is to achieve a communication device and process enabling optimum use of a communication network connecting a central unit to stations.

This object is achieved by the fact that at least one station comprises means for storing data representative of type of information to be transmitted and means for storing parameters representative of conditions for transmission of information from the station to the central unit, associated to the data representative of type of information to be transmitted.

Said at least one station comprises, in particular, checking means to transmit information defined by type of information to be transmitted data according to the parameters representative of transmission conditions.

Preferably, at least one of the parameters representative of transmission conditions is representative of transmission of information on a request from the central unit.

According to a first alternative embodiment, at least one of the parameters representative of transmission conditions is representative of transmission of information according to a preset variation of an item of information.

According to a second alternative embodiment, at least one of the parameters representative of transmission conditions is representative of transmission of information at preset time intervals.

According to a third alternative embodiment, at least one of the parameters representative of transmission conditions is representative of transmission of information on an event.

In a first particular embodiment, the checking means are connected to a device for measuring electrical quantities.

In a second particular embodiment, the checking means are connected to an electronic trip device supplying information representative of electrical quantities and status information.

Advantageously, at least one station comprises storage means for storing information temporarily.

According to the invention, a communication process between a central unit and at least one station comprises an operating phase comprising:
- a stage for checking information transmission conditions according to transmission condition parameters, and
- a stage for information transmission according to checking of transmission conditions.

Preferably at least one transmission condition parameter is representative of transmission of information on a request from the central unit.

According to a first alternative embodiment, at least one transmission condition parameter is representative of transmission of information according to a variation of the value of an item of information.

According to a second alternative embodiment, at least one transmission condition parameter is representative of transmission of information at preset time intervals.

In a preferred embodiment, the communication process comprises a parameter setting phase comprising:
- a transmission stage by the central unit to at least one station of data representative of type of information to be transmitted, and
- a storage stage in at least one station of data representative of type of information to be transmitted.

Advantageously, the communication process comprises a parameter setting phase comprising:
- a transmission stage by the central unit to at least one station of the parameters representative of information transmission conditions, and
- a storage stage in at least one station of the parameters representative of transmission conditions.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
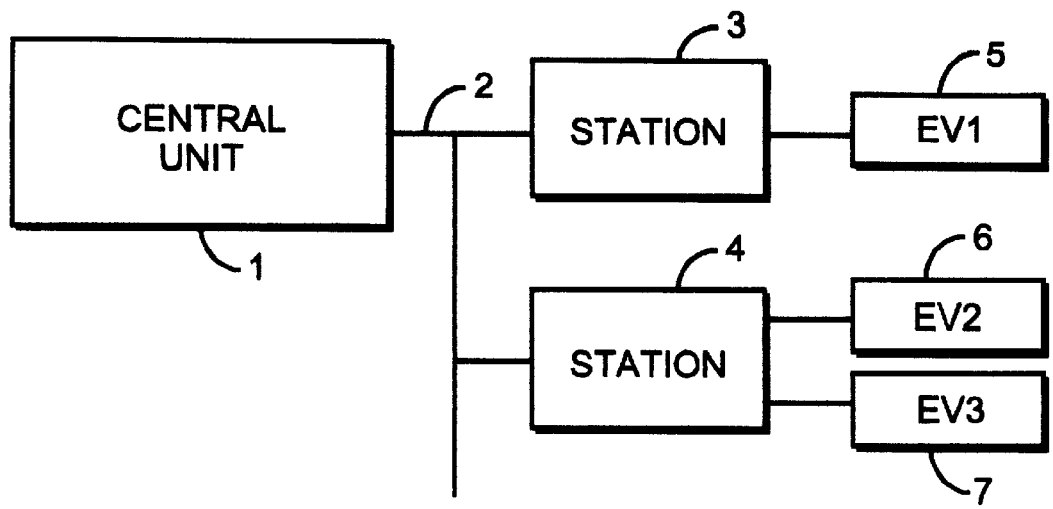
FIG. 1 represents a known communication device.

The communication device of FIG. 1 comprises in known manner a central unit 1 connected to a communication network 2 and stations 3 and 4 also connected to the communication network. In this embodiment, the station 3 is connected to an events detector 5 and the station 4 is connected to events detectors 6 and 7.

If this communication device operates in master-slave mode, the central unit 1 requests information from the stations 3 or 4 which reply to it. This exchange mode occupies the network twice at each information request. Thus, when the data have to be frequently refreshed in the central unit, the network occupation rate becomes very high.

To avoid the problem of double data flow in master-slave operation, the communication device can operate in exchange on event mode. In this case, a large quantity of information can be received by the central unit. Among this information, a large part is liable not to be systematically used. This flow of useless information increases the network occupation rate.

In devices according to embodiments of the invention, the stations comprise means for checking transmission of information to the central unit so as to optimize the information flow in the communication network. Thus, the stations transmit information to the central unit according to predetermined transmission criteria. These criteria are associated to items of information or to types of information. For example, a station can transmit certain information on a request from the central unit and other information on occurrence of an event.

Figure 2:
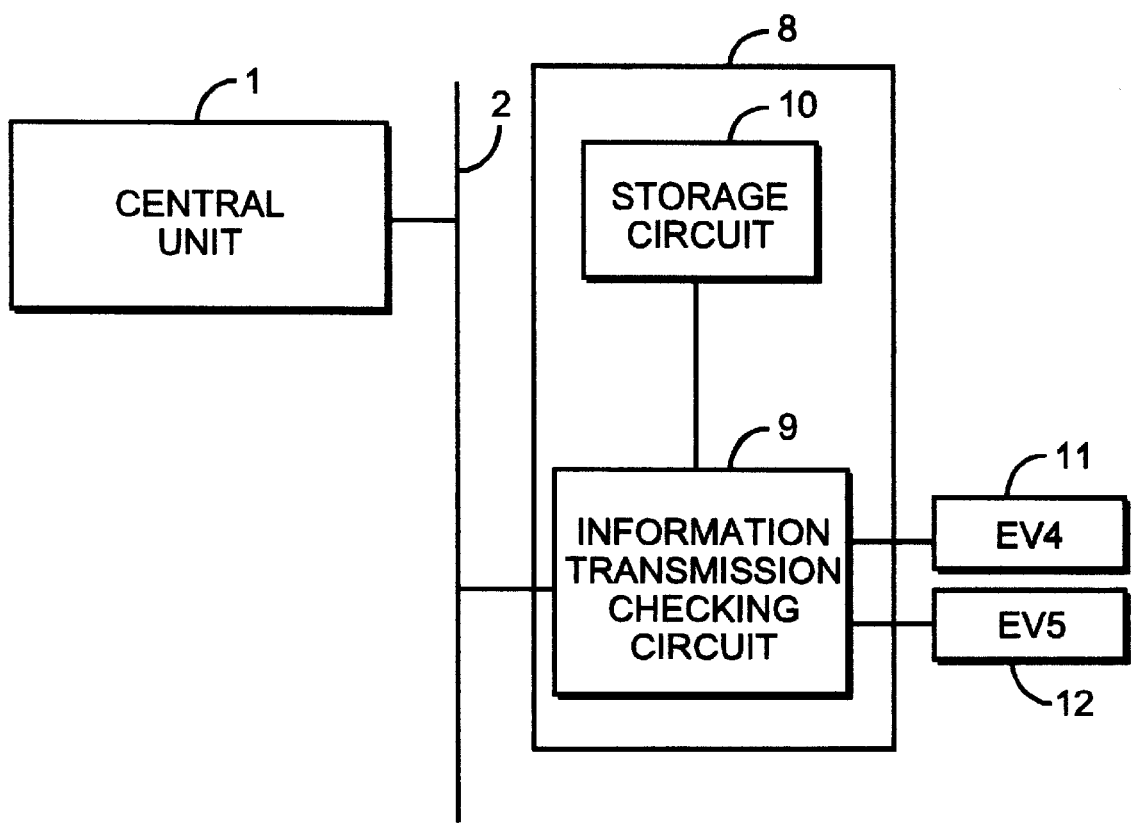
FIG. 2 represents a communication device according to an embodiment of the invention.

FIG. 2 represents a block diagram of a communication device according to an embodiment of the invention. A station 8 connected to the communication network 2 comprises an information transmission checking circuit 9 connected to the network and a storage circuit or memory 10 connected to the checking circuit 9. Events detectors 11 and 12 connected to the checking circuit 9 supply information to the station.

The storage circuit 10 stores transmission condition parameters associated to information or to types of information. The transmission condition parameters correspond for example to information transmissions on a request from the central unit, on a variation of a value of certain variables, at preset time intervals, or when an event is detected. Thus, the circuit 9 checks information transmission according to the parameters stored in the storage circuit.

The storage circuit parameters can be set either in fixed manner or in dynamic manner in a parameter setting phase. During this parameter setting phase, the central unit indicates to the station concerned the information it has to receive and the transmission condition parameters associated to each item of information. In this embodiment, the information flow in the network is optimized as the station only transmits to the central unit the necessary information for the application for which it is intended.

If the application of the central unit changes, the information and the parameters for information transmission from the station to the central unit can be changed in another parameter setting phase.

Figure 3:
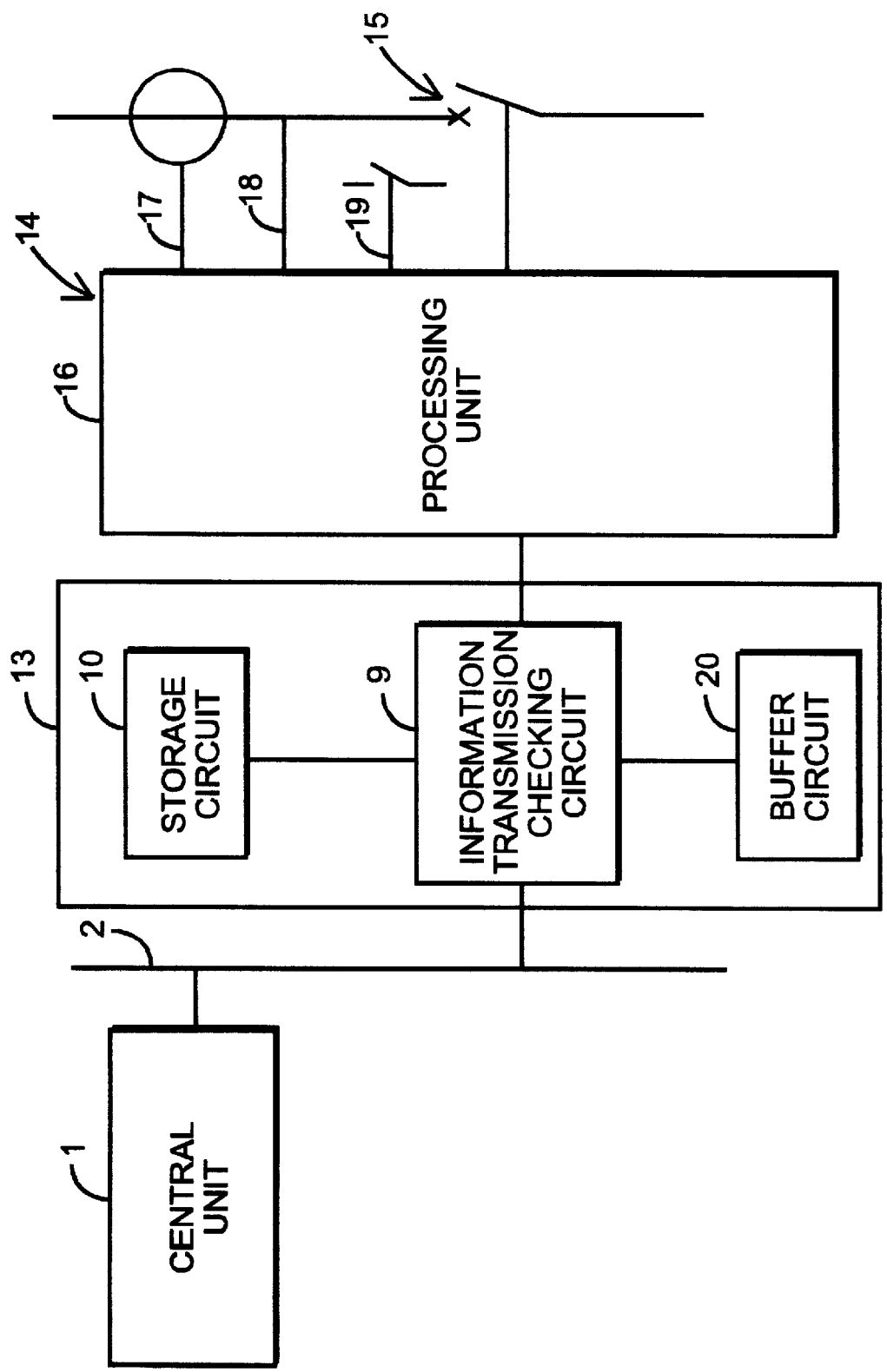
FIG. 3 represents a communication device according to an embodiment of the invention comprising a station connected to an electronic trip device.

FIG. 3 represents an embodiment of a device according to the invention comprising a station 13 connected to an electronic trip device 14 of a circuit breaker 15. The electronic trip device comprises a processing unit 16 connected to the station 13. This processing unit receives signals representative of currents, signals representative of voltages, and for example signals representative of the status of the electrical contacts. The processing unit supplies an opening order of the circuit breaker main contacts according to the signals it receives.

The processing unit computes a large number of electrical or physical quantities according to the signals 17, 18, 19 representative of currents or voltages. These quantities are in particular rms, peak or mean values, and also harmonics, currents or voltages; power values, phase difference values or values of the electrical energy supplied via the circuit breaker; values representative of tripping functions on fault currents or temperature rises. All of these quantities and others, in particular representative of settings of the processing unit such as thresholds or time delays, can be transmitted to the central unit 1 via the station 13.

In a parameter setting phase, the central unit transmits to the station data representative of the information it has to receive and transmission condition parameters associated to the information. The data and parameters are stored in the circuit 10 to be used by the checking circuit 9. Then, during the operating phase, the processing unit transmits to the station the quantities it disposes of in the form of information. The checking circuit transmits information to the central unit according to the parameters stored in the storage circuit 10. The station can advantageously comprise a buffer circuit 20 for temporary storage of the information supplied by the processing unit.

In the embodiment of FIG. 3, in the parameter setting phase, the central unit can for example request to receive contact opening or closing information as soon as these events occur, voltage or current variation information when these are detected by the checking circuit, electrical power information at preset time intervals or phase difference values when the central unit requests them.

In order to optimize the information flow in the network, the information which the central unit requires frequently or rapidly is transmitted automatically by the station on an event or at a preset time interval, and the information which concerns the central unit randomly or which does not have to be frequently refreshed is preferably transmitted on a request from the central unit.

Figure 4:
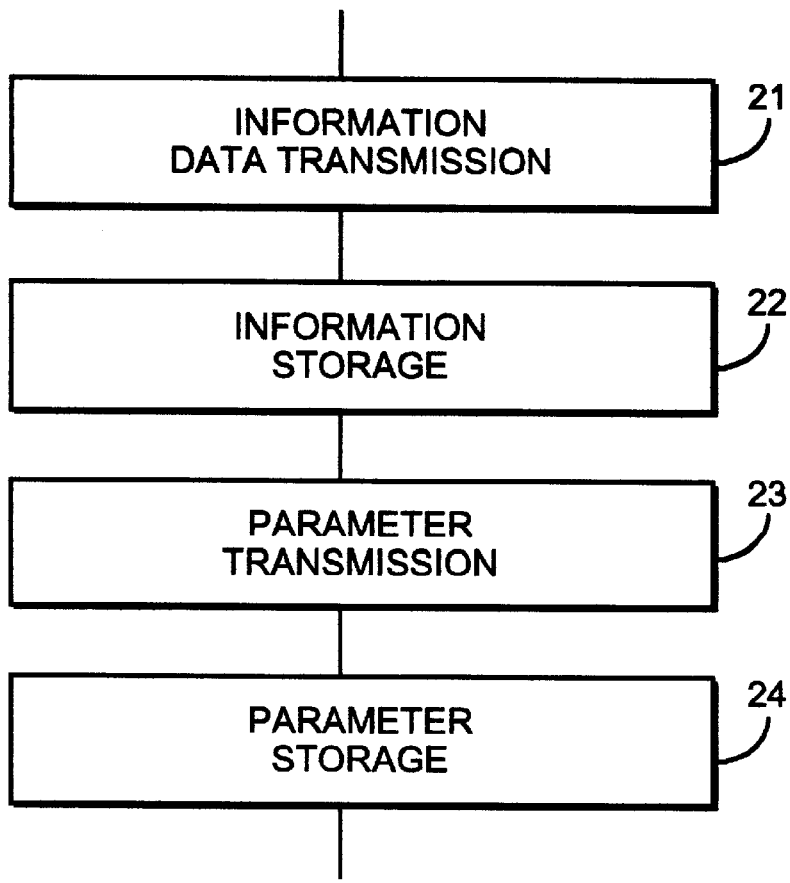
FIG. 4 represents a parameter setting phase of a communication process according to an embodiment of the invention.

FIG. 4 represents a flowchart of a parameter setting phase of a communication process according to the invention.

In a stage 21, the central unit transmits to the station data representative of the information or types of information it has to receive. Then, in a stage 22, this data is stored in the station. Then, in a stage 23, the central unit transmits transmission condition parameters to the station, and these parameters are stored in a stage 24.

Stages 21 and 23 can also be grouped in a single stage where the data representative of the information and the transmission condition parameters are transmitted in a single frame. In this case, the data and parameters are stored, for example, in the order of their receipt by the station.

Figure 5:
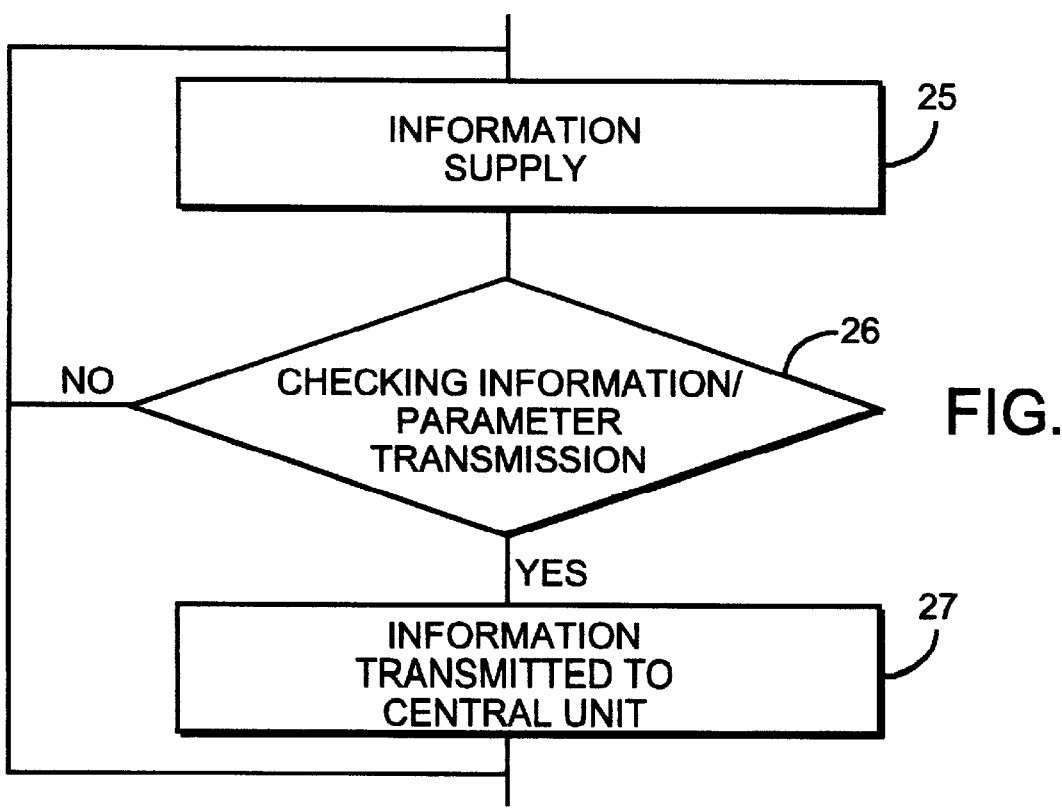
FIGS. 5 and 6 represent a first and second operating phase of communication processes according to embodiments of the invention.

The flowchart of FIG. 5 represents an operating phase in an embodiment of a process according to the invention. In a stage 25, information is supplied to the station. This information represents for example electrical quantities or events such as opening of contacts or tripping of a circuit breaker. Then, in a stage 26, the checking circuit determines according to the stored data and parameters whether information has to be transmitted and under what conditions. Thus, if transmission conditions are complied with, the station transmits the information in a stage 27.

Figure 6:
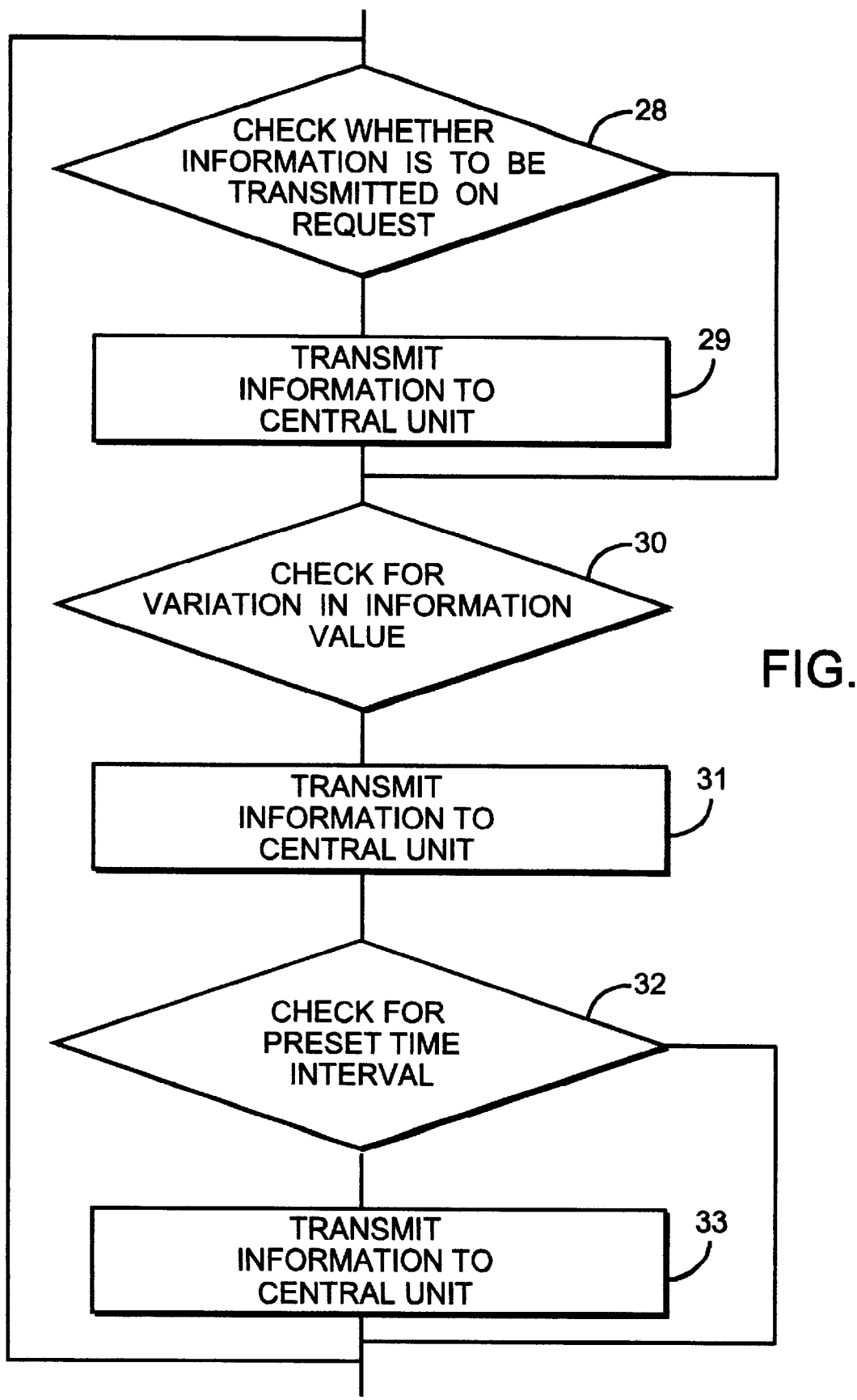

FIG. 6 represents a detailed flowchart of an operating phase of a station. In a first stage 28, the checking circuit checks whether an information item has to be transmitted on a request from the central unit, then transmits said information if the condition is complied with at stage 29. In a stage 30, the checking circuit checks whether the value of an information item has varied from a preset value, then it transmits said information to the central unit (stage 31) if this variation is effective. Then, in a stage 32, the checking circuit waits for preset time intervals before transmitting information concerned by said intervals to the central unit in a stage 33.

The transmission conditions described above are not restrictive. Other transmission conditions can be used in other embodiments. These conditions may be complex. For example, a transmission condition may be a combination of several conditions. Likewise, an information item may be transmitted according to several distinct criteria for example, on a request from the central unit and according to a preset time interval.

The events detectors 6, 7, 11 and 12 represent all the applications associated to the stations and able to generate information to be transmitted to the central unit. These detectors may be electronic trip devices as in FIG. 3, relays, measuring devices, or other monitoring devices.

What is claimed is:

1. A communication device, comprising
   (a) a central unit;
   (b) at least one station connected with said central unit, said station including
      (1) means for storing data received from said central unit representative of a type of information to be transmitted, said data permitting selection of information to be transmitted;
      (2) means for storing parameters received from said central unit representative of conditions for transmitting information from said station to said central unit, said parameters relating to said data; and
      (3) checking means for transmitting selected information in accordance with said parameters; and
   (c) an electronic trip device connected with said at least one station for receiving selected information transmitted therefrom, said electronic trip device supplying information representative of electrical quantities.

2. The communication device according to claim 1, wherein at least one of the parameters representative of transmission conditions is representative of transmission of information on a request from the central unit.

3. The communication device according to claim 1, wherein at least one of the parameters representative of transmission conditions is representative of transmission of information according to a preset variation of an item of information.

4. The communication device according to claim 1, wherein at least one of the parameters representative of transmission conditions is representative of transmission of information at preset time intervals.

5. The communication device according to claim 1, wherein at least one of the parameters representative of transmission conditions is representative of transmission of information on an event.

6. The communication device according to claim 1, wherein the checking means are connected to a device for measuring electrical quantities.

7. The communication device according to claim 1, wherein at least one station comprises storage means for storing information temporarily.

8. The communication device according to claim 1, wherein said electronic trip device supplies information representing the status thereof.

9. A process for communicating between a central unit, a station connected with the central unit, and an electronic trip device connected with the station, comprising
   (a) indicating from the central unit to the station data representative of a type of information to be transmitted to the central unit and parameters representative of conditions for transmitting information from the station to the central unit;
   (b) storing data representative of a type of information to be transmitted, the data permitting selection of information to be transmitted;
   (c) storing parameters representative of conditions for transmitting information from the station to the central unit, the parameters relating to the data; and
   (d) checking the parameters and transmitting selected information in accordance with said parameters representative of conditions for transmitting information.

10. The communication process according to claim 9, wherein at least one transmission condition parameter is representative of transmission of information on a request from the central unit.

11. The communication process according to claim 9, wherein at least one transmission condition parameter is representative of transmission of information according to a variation of the value of an item of information.

12. The communication process according to claim 9, wherein at least one transmission condition parameter is representative of transmission of information at preset time intervals.

13. The communication process according to claim 9, wherein said parameters are transmitted by the central unit to the station.

* * * * *